Figure 1:
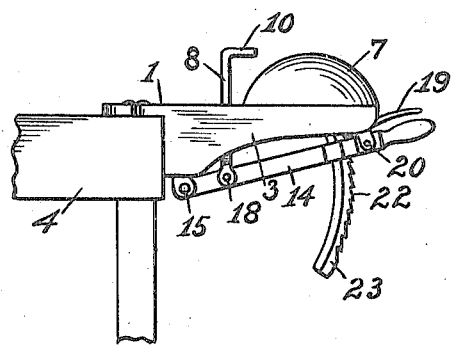

Jan. 23, 1923.                                             1,443,141.
E. L. MONROE.
TIRE CASING HOLDING DEVICE.
FILED JULY 25, 1919.

Inventor
E. L. Monroe
By G. E. Dunstan,
his Attorney

Patented Jan. 23, 1923.

1,443,141

UNITED STATES PATENT OFFICE.

ELMER L. MONROE, OF LORAIN, OHIO, ASSIGNOR OF ONE-THIRD TO CARL C. COLEMAN AND ONE-THIRD TO MYRON A. BURNETT, BOTH OF LORAIN, OHIO.

TIRE-CASING-HOLDING DEVICE.

Application filed July 25, 1919. Serial No. 313,154.

*To all whom it may concern:*

Be it known that I, ELMER L. MONROE, a citizen of the United States, residing at Lorain, in the county of Lorain and State of Ohio, have invented certain new and useful Improvements in Tire-Casing-Holding Devices, of which the following is a specification.

This invention relates to devices for holding tire casings while being repaired, and has for its principal object to provide a clamping device, which will hold that part of a tire casing to be patched with the inside surface out in a stretched condition over a block.

A further object of this invention is to provide a device of said character, which is simple in construction, and easily and quickly operated.

With the above and other objects in view as will be readily understood, the invention will be hereinafter fully described as illustrated in the accompanying drawings, and the novel features thereof will be distinctly pointed out in the appended claims.

In the drawings similar characters of reference designate corresponding parts.

Figure 2:
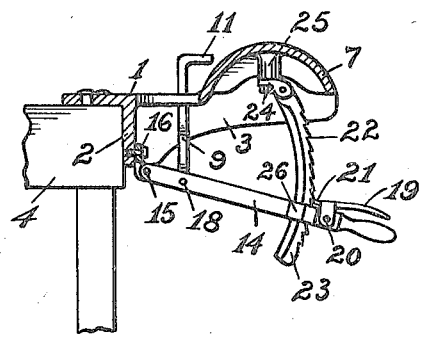
Figure 3:
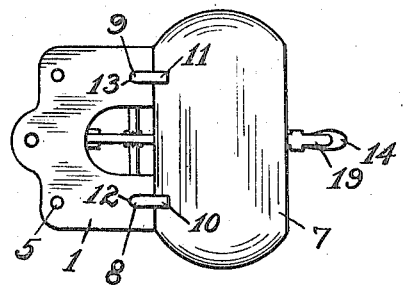
Figure 4:
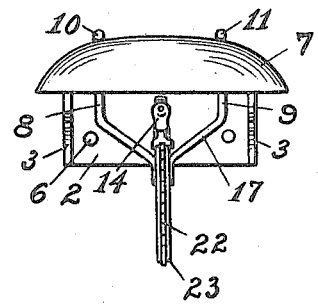
Figure 5:
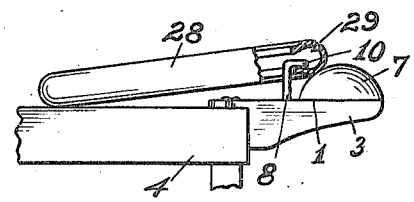
Figure 6:
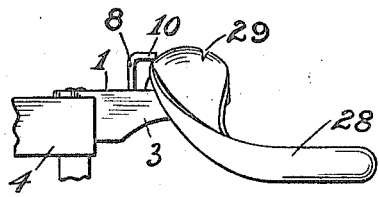
Figure 7:
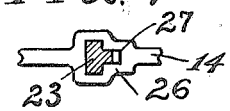

Figure 1 is a side elevation of a device constructed in accordance with my invention, the clamping hooks being in their upper position, Fig. 2 is a longitudinal sectional view, the clamping hooks being in their down position, Fig. 3 is a plan view of the device, Fig. 4 is a front view, Fig. 5 illustrates a tire casing arranged for being clamped and then turned inside out, Fig. 6 shows the tire casing turned inside out ready to be repaired, and Fig. 7 illustrates a cross section of the circular toothed bar and the hand lever.

Referring to the drawings, 1 represents a top plate which is formed integrally with a vertical back plate 2 arranged at a distance from the rear edge thereof, and side plates or brackets 3. The overlapping rear portion of the top plate 1 forms with the back plate 2 an angular part for fitting over the top of a work bench as 4 and against the side thereof, and bolts passing therethrough at 5 and 6 securely fasten the same to the work bench. The forward portion of the top plate 1 is convex to provide a transversely extending block 7 for supporting a tire casing to be repaired. Said block is rounding from rear to front, as best shown in Fig. 2, and its ends are sloping and also rounded off as shown in Fig. 4.

In order to clamp one edge of a tire casing to the block 7, so that it may be turned inside out thereover, a pair of clamping hooks 8 and 9 having forwardly extending upper ends 10 and 11 for engaging the edge of the casing, are slidably mounted in openings 12 and 13 of the top plate 1. Said clamping hooks are actuated vertically by means of a hand lever 14, which is pivoted at 15 to a bifurcated bracket 16 carried by the back plate 2. The lower portions of the clamping hooks are inclined inwardly at 17 and their lower ends pivoted to said hand lever at 18. It is necessary to lock the hand lever so as to hold the clamping hooks in engagement with the tire casing. For this purpose, a suitable latch 19 is pivoted to the hand lever 14 at 20, and its inner end 21 is adapted to engage teeth 22 in the edge of a circular bar 23, the upper end of which is pivotally connected to a bifurcated bracket 24 fixed to a central boss 25 on the under side of the block 7. The circular bar 23 is T shape in cross section, and the hand lever 14 is enlarged at 26 and provided with a corresponding opening 27 for receiving said circular bar, whereby the hand lever is guided and maintained in the same relation to said bar as it slides thereupon. By thus maintaining said relation between the hand lever and the circular bar, the teeth 22 are not worn by said sliding movement and the latch 19 operates more efficiently.

When it is desired to repair a tire casing 28 which is cut or otherwise damaged at 29, that part of the tire casing to be patched is laid upon the block 7 with the ends 10 and 11 of the clamping hooks 8 and 9 between the edges thereof, as shown in Fig. 5. The hand lever is forced downwardly thus actuating the clamping hooks and causing them to clamp the lower edge of the tire casing to the block. The tire casing is then turned up and pulled forward, by which action the part of the tire casing to be patched will become stretched over the block as shown in Fig. 6. By having the tire casing in this inside out stretched condition, it is convenient to patch for the purpose of vulcanizing the same.

Having fully described my invention, what I claim is:

1. In a tire casing holding device, the combination of a block, and means for holding one edge of a tire casing against the block whereby it may be turned up and pulled at a right angle over the block, substantially as described.

2. In a tire casing holding device, the combination of a block, the block being convex, and means for holding one edge of a tire casing against the block whereby it may be turned up and pulled at a right angle over the block, substantially as described.

3. In a tire casing holding device, the combination of a block, the block being convex, clamping hooks for entering between the edges of a tire casing when the tire casing is laid upon said block, and means for actuating said clamping hooks to cause them to hold one edge of the tire casing to said block whereby the tire casing may be turned up and pulled at a right angle over the block, substantially as described.

4. In a tire casing holding device, the combination of a block, the block being convex, clamping hooks for entering between the edges of a tire casing when the tire casing is laid upon said block, a hand lever for actuating the clamping hooks to cause them to hold one edge of the tire casing to said block whereby the tire casing may be turned up and pulled at a right angle over the block, and means for locking the hand lever in a set position, substantially as described.

5. In a tire casing holding device, the combination of a block, the block being convex, clamping hooks for entering between the edges of a tire casing when the tire casing is laid upon said block, a hand lever for actuating the clamping hooks to cause them to hold one edge of the tire casing to said block, a circular bar, the hand lever being provided with an opening for receiving the circular bar and sliding thereover, and means for locking the hand lever to the circular bar in a set position, substantially as described.

6. In a tire casing holding device, the combination of a block, the block being convex, clamping hooks for entering between the edges of a tire casing when the tire casing is laid upon said block, a hand lever for actuating the clamping hooks to cause them to hold one edge of the tire casing to said block, a circular bar, the bar being pivotally supported, the hand lever being provided with an opening for receiving the bar and sliding thereover, the bar having teeth, and a latch pivoted to said hand lever for engaging the teeth of said bar for locking the hand lever in a set position, substantially as described.

In testimony whereof I affix my signature.

ELMER L. MONROE.